Patented July 17, 1951

2,561,239

UNITED STATES PATENT OFFICE 2,561,239

PLASTICIZED RUBBERY COPOLYMER OF ISOBUTYLENE AND ISOPRENE

Winthrope C. Smith, Westfield, N. J., assignor to Standard Oil Development Company, a corporation of Delaware No Drawing. Application October 26, 1945, Serial No. 624,958

2 Claims. (Cl. 260—31.8)

This invention relates to the use of suitable aliphatic esters of aliphatic acids in compositions with olefinic copolymers, such as copolymers of isobutylene with a diolefin, to form vulcanizates of improved physical characteristics.

Rubber articles intended for use where low temperatures are encountered as in automobiles and airplanes are required to remain flexible at temperatures as low as −40° F. Special vulcanizates of natural rubber with certain sulfur ratios and certain accelerators have shown good flexibility at subzero temperatures. Certain vulcanizates of synthetic rubbery polymers, particularly the vulcanized olefinic copolymers of olefins with diolefins, have shown as good flexibility in comparison to natural rubber vulcanizates at moderately low subzero temperatures, but it has been found desirable to improve their low temperature flexibility still further to meet the stated requirements.

Improvement of low temperature flexibility of olefinic copolymer vulcanizates has to be obtained by a distinctive manner of compounding. In general, the rubbery olefinic copolymers do not need the mastication required by natural and relatively hard and dry synthetic rubbers in processing, and materials among those most useful as softeners to facilitate the processing of such rubbers do not have a desired effect on the physical properties of cured olefinic copolymers. Some of these softeners interfere with vulcanization of the olefinic copolymers, and others have an adverse or no substantially favorable effect on the cured products.

An object of this invention is to impart substantially improved cold resistance or low temperature flexibility to a vulcanizate of olefinic copolymers by incorporating suitable aliphatic esters of aliphatic acids.

A more specific object of this invention is to provide for the utilization of a relatively high molecular weight alkyl ester of a polycarboxylic aliphatic acid, having preferably more than 14 carbon atoms per molecule, for conferring on vulcanized olefinic copolymers of isobutylene with isoprene required flexibility at temperatures as low as −40° F. and lower without deleterious effects on other desirable physical properties of the vulcanizate.

The olefinic copolymers are polymeric materials synthesized by low temperature catalytic polymerization of an olefin, such as isobutylene, with a diolefin, such as isoprene. These copolymers have become known by the term "butyl rubber." Methods of manufacturing and compounding these materials are given in the U. S. Patent 2,356,128 of August 22, 1944, to R. M Thomas and W. J. Sparks. Properties of these materials are further described in an article beginning on page 1282 of Ind. Eng. Chem., vol. 32, No. 11, October 1940.

Although procedures for the preparation of butyl rubber are described in the above-mentioned patent, a general method of preparation will be briefly outlined.

Butyl rubber is prepared by reacting a mono-olefin, such as isobutylene, with a diolefin, such as isoprene, at a temperature below 0° C. in the presence of a Friedel-Crafts catalyst, such as aluminum chloride. The mono-olefin reactant is preferably used in a major proportion with respect to the diolefin. In a typical preparation, ½ to 20 parts of isoprene and 99½ to 80 parts of isobutylene are mixed with a solution of aluminum chloride dissolved in an organic solvent which forms no complex with the catalyst and is liquid at the reaction temperature. The reaction temperature is preferably in the range −50° C. to about −165° C. A useful solvent for the metal halide catalyst is an alkyl halide such as methyl chloride or ethyl chloride.

The resulting olefinic copolymer is a tough, elastic product resistant to oxidation and chemical attack. It is characterized, generally, by low unsaturation, e. g., iodine numbers below 50. Copolymers of this type have been estimated to have average molecular weights above 15,000 and often between 30,000 and 80,000. Butyl rubber can be processed on conventional rubber machinery. It becomes soft and plastic at roll temperatures of the order of 80 to 100° C. Vulcanization is effected by heating with sulfur and zinc oxide, and with other sulfurization aids as described in the above-mentioned patent, which also shows that other compounding agents, including certain accelerators, fillers, and softeners, may be employed.

Now in accordance with the present invention it is found that in order to impart improved cold resistance to the vulcanized olefinic copolymer product a specific type of agent must be used.

Aliphatic esters now determined to be particularly effective for increasing the cold resistance of butyl rubber or olefinic copolymer vulcanizates are compounds which contain at least 15 carbon atoms per molecule with 4 to 6 oxygen atoms per molecule as in the di- and tri-alkyl esters, di-(ethyl hexyl) sebacate, tributyl aconitate, dibutyl azelate, diamyl azelate, and the like.

Extensive tests with a number of aliphatic esters have shown that the minimum of 15 carbon atoms in the molecule is a critical index for dividing the class of suitable esters from those unsuitable for the objects of this invention. The preferred aliphatic esters have from 15 to about 36 carbon atoms per molecule. From about 5 to 60 parts by weight of these suitable esters may be incorporated with 100 parts by weight of the copolymer gum during compounding, but ordinarily 5 to 20 parts of the ester per 100 parts of gum is sufficient.

In determining the cold or freeze resistance qualities of the vulcanizates, a method termed "The Envelope Freeze Test" was used. This is a very severe test conducted on samples of the vulcanizate stocks calendered on fabrics. In these tests a wide variety of addition agents were compared.

*Test procedure*

A piece of the calendered fabric 4″ x 6″ is folded in half, with the rubber or vulcanizate coating on the inside. With the folded edge of this resultant 4″ x 3″ specimen at the bottom, the two bottom corners are folded again into two isosceles triangles 1½″ x 1½″ x 2″ leaving a 1″ portion of the original fold between them. The envelopes are placed in the cold box at the specified temperature with a 650 g. weight over the folds. After five hours the envelopes are snapped open as rapidly as possible in the cold box by grasping the top open ends. Cracking through to the fabric at the fold constitutes a failure.

Representative data on the vulcanizate formulation and test results are as follows:

*Formulae*

|  | A | B | C | D | E | F |
|---|---|---|---|---|---|---|
| Isobutylene-Isoprene Copolymer | 100 | 100 | 100 | 100 | 100 | 100 |
| Zinc Oxide | 5 | 5 | 5 | 5 | 5 | 5 |
| Stearic Acid | 1 | 1 | 1 | 1 | 1 | 1 |
| Tuads [1] | 1 | 1 | 1 | 1 | 1 | 1 |
| Selenac [2] | 1 | 1 | 1 | 1 | 1 | 1 |
| Sulfur | 2 | 2 | 2 | 2 | 2 | 2 |
| Wax | 3 | 3 | 3 | 3 | 3 | 3 |
| Clay | 75 | 75 | 75 | 75 | 75 | 75 |
| Dibenzyl Sebacate |  | 15 |  |  |  |  |
| Di-isobutyl Adipate |  |  | 15 |  |  |  |
| Tributyl Aconitate |  |  |  | 15 |  |  |
| Di (Ethyl hexyl) Sebacate |  |  |  |  | 15 |  |
| Diamyl Azelate |  |  |  |  |  | 15 |

[1] Tetramethyl thiuram disulfide.
[2] Selenium tetraethyl dithiocarbamate.

| Cure 60′ at 287° F. | A | B | C | D | E | F |
|---|---|---|---|---|---|---|
| Tensile-Elongation | 2,410-730 | 2,270-840 | 2,120-770 | 1,970-780 | 2,170-790 | 2,160-730 |
| Modulus at 300%-Shore | 350- 45 | 120- 28 | 200- 37 | 150- 34 | 200- 34 | 170- 33 |

*Freeze-resistance-envelope test*

|  | A | B | C | D | E | F |
|---|---|---|---|---|---|---|
| −20° F | OK | OK | OK | OK | OK | OK. |
| −40° F | Failed | Failed | Bad Crease | OK | OK | OK. |
| −50° F |  |  | Failed | Sl. Crease [3] | OK | Sl. Crease.[3] |
| −60° F |  |  |  | Bad Crease | Sl. Crease [3] | Bad Crease. |
| −70° F |  |  |  | Failed | Failed | Failed. |

[3] Slight crease.

The data illustrate how the suitable esters with more than 14 carbon atoms per molecule confer greatly improved cold resistance on the vulcanizates. It is to be noted that the tributyl aconitate, sebacate, and diamyl azelate with 18, 26 and 19 carbon atoms per molecule, respectively, give a considerably greater improvement than the aromatic ester or the adipate and that their incorporation into the vulcanizates accomplishes the objects of this invention. The aromatic ester, dibenzyl sebacate, made no improvement. The di-isobutyl adipate, which has no more than 14 carbon atoms per molecule, made a slight but insufficient improvement.

This test determines the flexibility and resilience imparted to the copolymer by the addition of esters in terms of recovery and speed of recovery after compression.

The formula used is as follows:

| | |
|---|---|
| Copolymer parts | 100 |
| Zinc oxide do | 5 |
| Sulfur do | 2 |
| Tetramethyl thiuram disulfide do | 1 |
| Mercaptobenzothiazole do | 0.5 |
| SRF Black (Gastex) do | 50 |
| Aliphatic ester volumes | 10 |

Molded cylinders 0.3″ in diameter and 0.6″ in height were cured of each stock for 60′ at 287° F. The test was conducted in a methanol bath at −20° F. using an ASTM asphalt penetrometer with a foot ¾″ in diameter. Three samples were run and the results average in each stock. The slugs were preconditioned by cycling once through 20% compression, then being compressed 15% of their original height, held for 10′ and released, taking recovery readings at 3, 5, 10, 20, 40, 90 seconds. The following data were obtained.

| Time in Seconds | 3 | 5 | 10 | 20 | 40 | 90 |
|---|---|---|---|---|---|---|
| | Recovery in Per Cent | | | | | |
| Control | 30.5 | 39.2 | 49 | 58 | 66 | 73 |
| Di(ethylhexyl) sebacate | 59.8 | 64.8 | 72.3 | 77.4 | 81.8 | 85.2 |

Thus the great increase in recovery and recovery rate, at low temperatures, brought about by the use of di(ethylhexyl) sebacate is demonstrated. This test is applicable to mechanical goods and inner tubes whereas the envelope test can be applied to proofed goods.

Advantageously, the cold resistant butyl rubber stocks improved by the suitable types of aliphatic esters remain light in color, have little or no odor, and have a low heating loss, resulting in retension of desired freeze resistance over long periods of time. These suitable esters do not destroy the normal tack of butyl rubber, thus permitting normal building operations, and allowing good adhesion to fabrics. There was no evidence of bleeding from the uncured or cured stocks containing these esters, thus showing good compatibility. The tensile strength and elongation of the stocks are maintained to a satisfactory extent by the aliphatic esters which give the desired improvement in cold resistance. In general, these esters have also given the stocks superior adhesion properties.

The specially useful aliphatic esters have accordingly been demonstrated to be compounds containing more than 14 carbon atoms per molecule.

It is not intended that this invention be limited by the examples given for the purpose of illustration, since modifications thereof as set forth may be made without departing from the spirit and scope of the invention defined in the appended claims.

I claim:

1. A vulcanizable composition of matter comprising 100 parts of a rubbery copolymer consisting of 99½ to 80 parts of isobutylene and ½ to 20 parts of isoprene, the said copolymer having an iodine number below 50, and 5 to 60 parts by weight of di(ethyl hexyl) sebacate.

2. A cold resistant vulcanizate of a rubbery copolymer of 99½ to 80 parts by weight of isobutylene and ½ to 20 parts by weight of isoprene, the said copolymer having an iodine number below 50 and the vulcanizate containing 5 to 20 parts by weight of di(ethyl hexyl) sebacate per 100 parts by weight of the said copolymer.

WINTHROPE C. SMITH.

REFERENCES CITED

The following references are of record in the file of this patent:

UNITED STATES PATENTS

| Number | Name | Date |
| --- | --- | --- |
| 2,339,387 | Endres | Jan. 18, 1944 |
| 2,349,412 | Douglas | May 23, 1944 |
| 2,360,896 | Sarbach | Oct. 24, 1944 |

FOREIGN PATENTS

| Number | Country | Date |
| --- | --- | --- |
| 112,875 | Australia | Apr. 24, 1941 |